US009716728B1

(12) United States Patent
Tumulak

(10) Patent No.: US 9,716,728 B1
(45) Date of Patent: Jul. 25, 2017

(54) INSTANT DATA SECURITY IN UNTRUSTED ENVIRONMENTS

(71) Applicant: Vormetric, Inc., San Jose, CA (US)

(72) Inventor: Derek Tumulak, San Jose, CA (US)

(73) Assignee: Vormetric, Inc., San Jose, CA (US)

( * ) Notice: Subject to any disclaimer, the term of this patent is extended or adjusted under 35 U.S.C. 154(b) by 87 days.

(21) Appl. No.: 14/023,113

(22) Filed: Sep. 10, 2013

Related U.S. Application Data

(60) Provisional application No. 61/820,580, filed on May 7, 2013.

(51) Int. Cl.
*H04L 9/08* (2006.01)
*H04L 29/06* (2006.01)

(52) U.S. Cl.
CPC ............ *H04L 63/20* (2013.01); *H04L 9/0861* (2013.01)

(58) Field of Classification Search
None
See application file for complete search history.

(56) References Cited

U.S. PATENT DOCUMENTS

| 6,073,242 | A  | * | 6/2000  | Hardy ............... G06F 21/604 380/255 |
| 7,334,124 | B2 | * | 2/2008  | Pham ............... H04L 63/102 380/37 |
| 8,284,943 | B2 | * | 10/2012 | Carrasco ........... H04L 12/4641 380/278 |
| 8,429,716 | B2 |   | 4/2013  | Earl et al. |
| 8,613,070 | B1 | * | 12/2013 | Borzycki ........... G06F 21/6218 726/8 |
| 8,621,220 | B2 |   | 12/2013 | Lynch |
| 8,745,384 | B2 |   | 6/2014  | Persaud et al. |
| 8,799,322 | B2 |   | 8/2014  | Demilo et al. |
| 8,856,300 | B2 |   | 10/2014 | de los Reyes et al. |
| 9,087,189 | B1 | * | 7/2015  | Koeten ............. H04L 41/022 |
| 9,413,730 | B1 | * | 8/2016  | Narayan ........... H04L 63/0471 |
| 2004/0003235 | A1 | * | 1/2004 | Musa ............... H04L 63/06 713/155 |

(Continued)

FOREIGN PATENT DOCUMENTS

| JP | 2005-65305    | * | 9/2004 |
| WO | WO2008042318  | * | 4/2008 |

OTHER PUBLICATIONS

Menezes et al. (Alfred J. Menezes, Paul C. van Oorschot, Scott A. Vanstone, "Handbook of applied cryptography", 1997, ISBN: 0849385237).*

(Continued)

*Primary Examiner* — Peter Poltorak
(74) *Attorney, Agent, or Firm* — Womble Carlyle Sandridge & Rice LLP

(57) ABSTRACT

A method of managing keys and policies is provided. The method includes communicating policies from a key and policy manager in an enterprise environment to an agent in a cloud environment. The method includes generating keys at the key and policy manager and distributing one or more of the keys to computing or communication devices in the enterprise environment, in accordance with the policies. The method includes enforcing the policies in the cloud environment via an application of the policies by the agent, wherein at least one method operation is executed through a processor.

19 Claims, 7 Drawing Sheets

(56) References Cited

U.S. PATENT DOCUMENTS

| | | | |
|---|---|---|---|
| 2007/0186281 A1* | 8/2007 | McAlister | H04L 63/20 726/14 |
| 2008/0072282 A1* | 3/2008 | Willis et al. | 726/1 |
| 2008/0082823 A1* | 4/2008 | Starrett | H04L 9/0825 713/171 |
| 2008/0127327 A1* | 5/2008 | Carrasco | 726/15 |
| 2009/0193503 A1* | 7/2009 | Shevehenko et al. | 726/4 |
| 2010/0011412 A1* | 1/2010 | Maximilien et al. | 726/1 |
| 2010/0088236 A1* | 4/2010 | Karabulut et al. | 705/59 |
| 2011/0016509 A1* | 1/2011 | Huang et al. | 726/1 |
| 2011/0022642 A1* | 1/2011 | deMilo et al. | 707/805 |
| 2011/0154031 A1* | 6/2011 | Banerjee | G06F 21/335 713/165 |
| 2011/0247047 A1* | 10/2011 | Loureiro | H04L 63/10 726/1 |
| 2012/0017085 A1 | 1/2012 | Carter et al. | |
| 2012/0179802 A1* | 7/2012 | Narasimhan | H04L 41/046 709/223 |
| 2012/0179904 A1* | 7/2012 | Dunn | G06F 21/575 713/155 |
| 2012/0240183 A1 | 9/2012 | Sinha | |
| 2013/0067225 A1* | 3/2013 | Shochet et al. | 713/165 |
| 2013/0073621 A1* | 3/2013 | Waddoups | G06F 21/6218 709/204 |
| 2013/0219176 A1* | 8/2013 | Akella et al. | 713/165 |
| 2013/0291052 A1* | 10/2013 | Hadar | G06F 21/6218 726/1 |
| 2014/0050317 A1* | 2/2014 | Sabin | H04L 9/08 380/44 |
| 2014/0068699 A1* | 3/2014 | Balacheff | H04L 41/5045 726/1 |
| 2014/0208132 A1* | 7/2014 | Cheston et al. | 713/310 |

OTHER PUBLICATIONS

Notification of Transmittal of the International Search Report and the Written Opinion of the International Searching Authority, PCT/US2014/036796, Feb. 11, 2015.

* cited by examiner

Security Options http://www.cloudco.com

Key and Policy Management

○ CloudCo Managed

◉ External

Hostname/IP Address: http://www.vormetric.acmeco.com

Access TokenId: AKIAIOSFODNN7

SecretAccessToken: xJalrXUtnFEMI/K7MDENG/bP

| Session ID | Sequence Number | Configuration Reference | Status Reference | HMAC |

| Session ID | Sequence Number | Request Status Upload | Request Configuration Download | Request Reset Session | HMAC |

FIG. 5D

INSTANT DATA SECURITY IN UNTRUSTED ENVIRONMENTS

This application claims the benefit of priority from U.S. Provisional Patent Application No. 61/820,580 filed May 7, 2013, which is hereby incorporated by reference for all purposes.

BACKGROUND

Encryption provides data security, using keys for encryption and decryption. Policies guide the use of the keys, data and software. Typically, a company (i.e., an enterprise) in an enterprise environment provides data security in the enterprise environment using keys generated and managed according to policies in the enterprise environment. If cloud services are used by the enterprise, typically a software as a service provider is responsible for data security in the cloud using keys generated and maintained by the software as a service provider, in accordance with policies controlled directly by the software as a service provider. These keys are generated and maintained in the cloud computing environment. Whether or not the cloud computing environment is a trusted environment is a decision enterprises face. Cloud service hosts may provide data security through setup of virtual private networks, using keys generated and maintained by the cloud service hosts, in accordance with policies controlled directly by the cloud service hosts. These keys are also generated and maintained in the cloud. Yet, there is a need in the art for a solution which would allow improvements in security, under more direct control by an enterprise.

SUMMARY

In some embodiments, a method of managing keys and policies is provided. The method includes communicating policies from a key and policy manager in an enterprise environment to an agent in a cloud environment. The method includes generating keys at the key and policy manager and distributing one or more of the keys to computing or communication devices in the enterprise environment, in accordance with the policies. The method includes enforcing the policies in the cloud environment via an application of the policies by the agent, wherein at least one method operation is executed through a processor.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIG. 5B is a screenshot of a configuration screen from the agent of FIG. 2, in accordance with some embodiments.

FIG. 5C is a packet format diagram of a poll packet sent by the agent of FIG. 2, in accordance with some embodiments.

FIG. 5D is a packet format diagram of a packet from a server to the key and policy manager of FIG. 2, in accordance with some embodiments.

DETAILED DESCRIPTION

A key and policy manager, operating in an enterprise environment, automatically secures data in the cloud through communication with one or more agents operating in the cloud. Each agent can work with one or more key and policy managers. A key and policy manager communicates policies from the enterprise environment to the agent(s) in the cloud environment, and generates and distributes keys in accordance to the policies. The agent enforces the policies in the cloud environment. The key and policy manager in the enterprise environment maintains control of the keys and the policies. A secure environment is thus extended from the enterprise environment to cloud service providers, via the policies and the keys.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Figure 1:
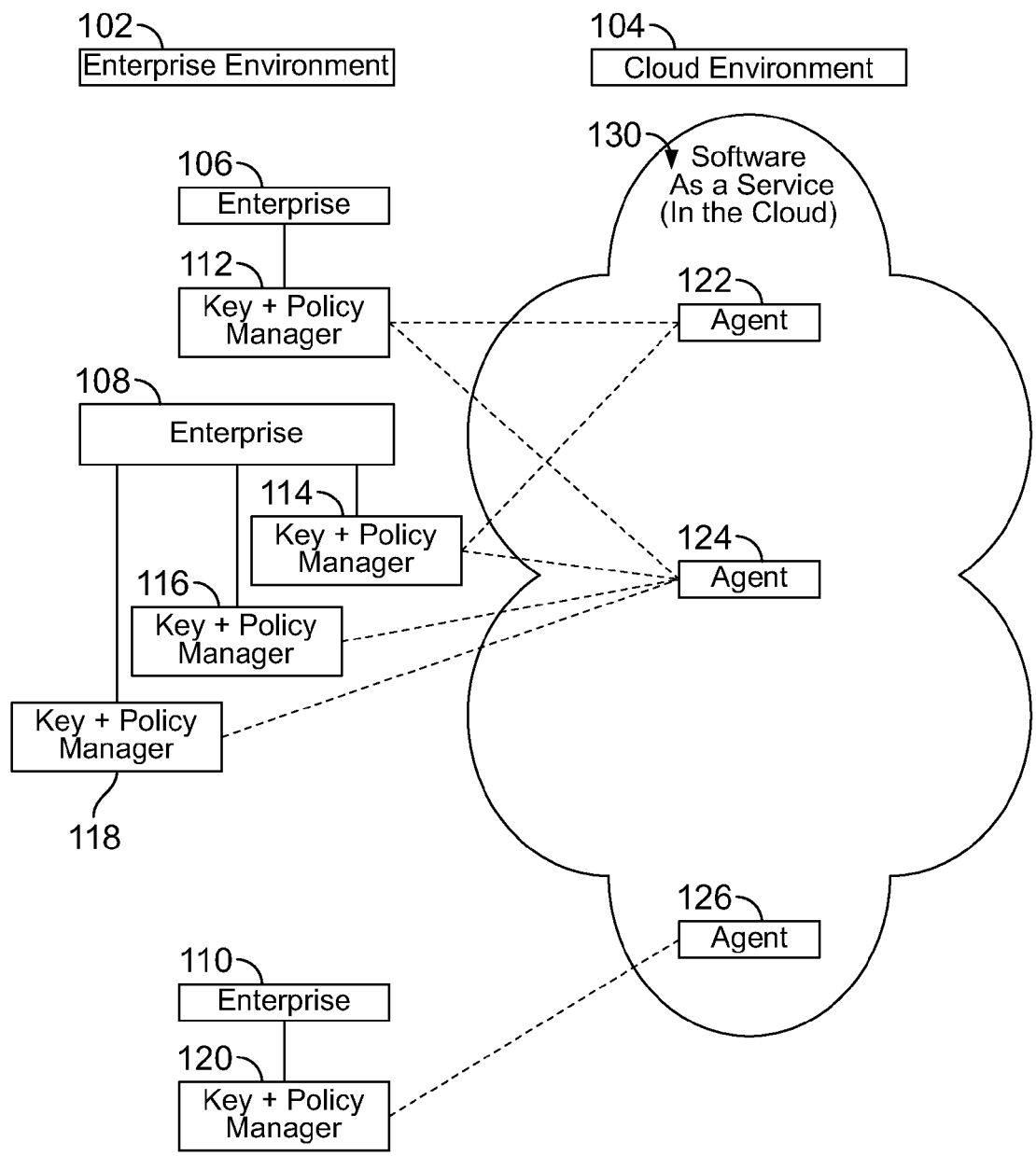
FIG. 1 is a schematic diagram of a data security system, with key and policy managers operating in an enterprise environment and agents operating in a cloud environment, in accordance with some embodiments.

FIG. 1 shows an embodiment of a data security system, in which keys and policies originate in and are controlled from the enterprise environment 102, and extend security to the cloud environment 104. Multiple enterprises 106, 108, 110, multiple key and policy managers 112, 114, 116, 118, 120, and multiple agents 122, 124, 126 have various interactions as will be further discussed below. Various further arrangements can be made in further examples of the data security system, as the key and policy managers and agents can operate in a one-to-one, a one-to-many, a many-to-one, or a many-to-many architecture. In the example shown, a first enterprise 106 has a first key and policy manager 112 communicating with a first agent 122 and a second agent 124. A second enterprise 108 has a second key and policy manager 114 communicating with the first agent 122, the second agent 124 and further agents (not shown), a third key and policy manager 116 communicating with the second agent 124, and a fourth key and policy manager 118 communicating with the second agent 124. A third enterprise 110 has a fifth key and policy manager 120 communicating with a third agent 126. Key and policy managers can be operated singly, or clustered, or in combinations of singles and clusters, etc. Devices in an enterprise, in the enterprise environment 102, receive cloud services from the cloud 130, i.e., from devices in the cloud environment 104. For a particular device in a particular enterprise, data is secured through cooperation between a key and policy manager 112, 114, 116, 118, 120 in the particular enterprise 106, 108, 110 and an agent 122, 124, 126 in the cloud 130.

Moving next to the cloud environment 104, the agents 122, 124, 126 are associated with software as a service, in the cloud 130 of FIG. 1. For example, the first agent 122 could be associated with a software as a service provider. The second agent 124 could be associated with the same software as a service provider, or a differing software as a service provider. The third agent 126 could be associated with either of these software as a service providers, or with another software as a service provider. In the example shown, the first agent 122 is communicating with the first key and policy manager 112 and the second key and policy manager 114. The second agent 124 is communicating with the first key and policy manager 112, the second key and policy manager 114, the third key and policy manager 116, and the fourth key and policy manager 118. The third agent 126 is communicating with the fifth key and policy manager 120. For a particular service provider, operating in the cloud environment 104, providing a cloud service to a particular device in an enterprise, data is secured through cooperation between the agent, associated with the service provider and the particular cloud service, and the key and policy manager associated with the enterprise and the particular device in the enterprise. It should be appreciated that while FIG. illustrates one cloud enterprise environment and one cloud environment, this is not meant to be limiting as the enterprise/cloud environments may be in the form of many to many, many to one, or one to many.

Figure 2:
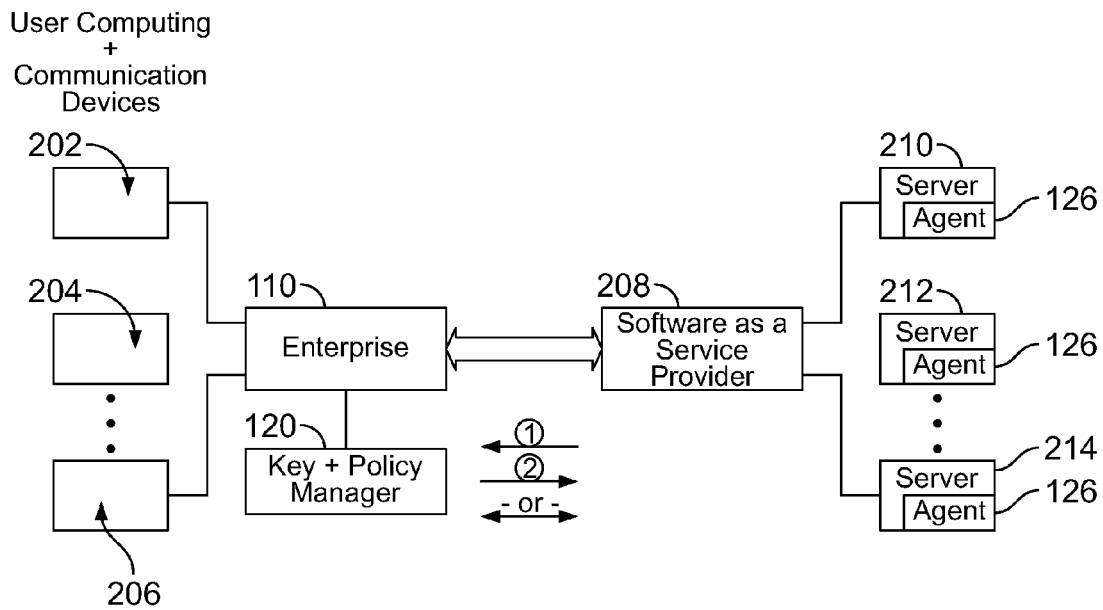
FIG. 2 is a schematic diagram of a key and policy manager and an agent, from the data security system of FIG. 1, providing data security to cloud services, in accordance with some embodiments.

FIG. 2 shows a key and policy manager 120 associated with the enterprise 110, and an agent 126 associated with a software as a service provider 208. Various user computing and communication devices 202, 204, 206 are operating in the enterprise 110, i.e., in the enterprise environment. The enterprise 110 receives cloud services from the software as a service provider 208. Various servers 210, 212, 214 are operating in the software as a service provider environment 208, i.e., in the cloud environment. Communication between the enterprise 110 and the software as a service provider environment 208 is shown as a thick, double headed arrow, and typically would take place over one or more networks, including the Internet. Communication between the key and policy manager 120 and the agent 126 is shown as either a first single headed arrow pointing from the agent 126 to the key and policy manager 120 and a second single headed arrow pointing from the key and policy manager 120 to the agent 126, or a double headed arrow pointing to both components. Accordingly, two example embodiments in which communication could be initiated by the agent 126 followed by a response from the key and policy manager 120, or could be bidirectional with either initiating are provided.

In the scenario shown in FIG. 2, one of the user computing and communication devices 202, 204, 206 could connect through an intranet in the enterprise 110, then through the Internet, through an intranet of the software as a service provider 208, to one of the servers 210, 212, 214 of the software as a service provider environment 208, in order to obtain a cloud service which could involve accessing data. The key and policy manager 120 would have already distributed policies, from the enterprise 110, to the agent 126. The key and policy manager 120 would generate keys, and distribute a key to the user computing or communication device, e.g., device 202, in accordance with the policies maintained on the key and policy manager 120. The key and policy manager 120 could also distribute a key to the agent 126. The agent 126 could administer the key to the appropriate server 212, in accordance with the policies received from the key and policy manager 120, and arrange for the server 212 to provide the cloud service to the user computing or communication device 202. Data handled by the server 212 would thus be secured by the keys, in accordance with the policies. In this and other like scenarios, the key and policy manager 120, operating in the enterprise environment, originates, controls, and maintains the policies and the keys. The key and policy manager 120 applies one or more of the keys in the enterprise environment, in accordance with the policies. The agent 126 applies the policies, and applies one or more of the keys in accordance with the policies, in the cloud environment. The agent 126 thereby enforces the policies in the cloud environment in some embodiments.

Figure 3:
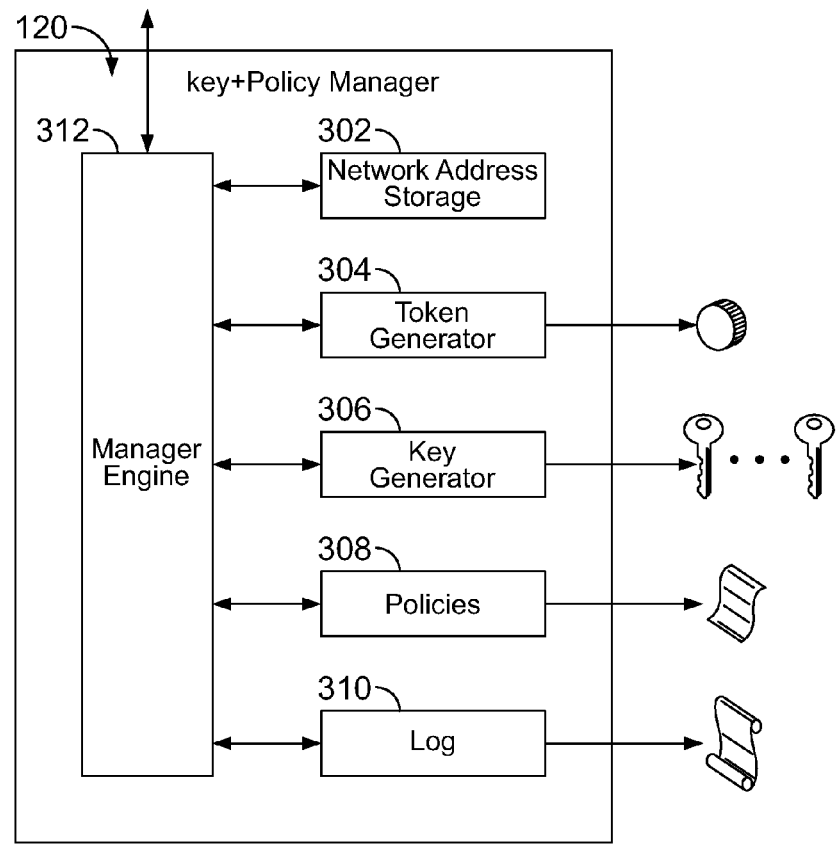
FIG. 3 is a schematic diagram of modules or components of a key and policy manager from FIG. 2, in accordance with some embodiments.

FIG. 3 shows an embodiment of a key and policy manager 120, which includes a manager engine 312, a network address storage 302, a token generator 304, a key generator 306, a policy storage 308, and a log storage 310. The key and policy manager 120 could be implemented as one or more processes executing on a processor, for example a processor in a server or other computing device. Particularly, the manager engine 312, the token generator 304 and the key generator 306 could be implemented as processes executing on a processor, and the various storages could be implemented using memory coupled to the processor. In various embodiments, the key and policy manager 120 is implemented as a standalone device such as a network appliance, or as one or more modules in a network appliance. The key and policy manager 120 could be implemented in various combinations of software, hardware and firmware. The network address storage 302 stores a network protocol address, such as an IP (Internet protocol) address. In the embodiment shown, the network address storage 302 is written to during setup, so that an IP address can be specified for the key and policy manager 120. Generally, the IP address or other network protocol address would be communicated to the agent during setup of the agent, so that the agent can communicate with the key and policy manager 120 in order to receive policies, keys, logs and so on.

The token generator 304 of FIG. 3 generates access token identifiers and secret access tokens, or other types of tokens. These tokens would generally be communicated to an agent during setup of the agent, so that the agent can authorize and authenticate communications from the key and policy manager 120 by using the tokens. It should be appreciated that the depiction of a token shown in FIG. 3 is symbolic, in that the tokens made by the token generator 304 are particular types of data used for authorization and authentication. The key generator 306 generates keys for encryption and decryption. For example, the key generator 306 could make use of one or more of various algorithms for generation of public and private keys. It should be appreciated that the depiction of keys shown in FIG. 3 is symbolic, in that the keys made by the key generator 306 are particular types of data used for encryption and decryption.

The policy storage 308 of FIG. 3 stores policies. For example, the policy storage could be implemented as a memory coupled to the manager engine 312. Policies could specify which user device, in the enterprise, could use which cloud services, and could specify who can use keys, how long keys are valid, what is a refresh period for renewing keys that will expire, time ranges that keys can be used, and/or a rate at which a key can be used. Policies could include an alert and a block threshold. In various embodiments, policies could include some or all of the above aspects, or could include other aspects as appropriate to a particular enterprise. These usage policies are sent to the agent or agents. For example, the manager engine 312 could read the policies from the policy storage 308, and send policies to an agent. The manager engine 312 could determine which policies to send to which agent, and send the policies accordingly. It should be appreciated that the depiction of a policy in FIG. 3 is symbolic, in that the policies stored in the policy storage 308 are a type of data, e.g., a script or a text file. The log storage 310 stores one or more logs. During operation, the manager engine 312 writes a log to the log storage 310, with the log having a history of the cloud services provided to computing or communication devices in the enterprise environment. Upon receipt of a request from an agent for a log, for purposes of an audit, the manager engine 312 can read a log from the log storage 310 and communicate the log to an agent. It should be appreciated that the depiction of a log in FIG. 3 is symbolic, in that the log or logs stored in the log storage 310 are a type of data, e.g., a text file, and need not necessarily be printed out as a paper scroll.

Continuing with FIG. 3, the manager engine 312 sends one or more of the keys to one or more of the computing or communication devices in the enterprise environment in accordance with the policies. The manager engine 312 can also send a additional keys to the one or more agents for distribution by the one or more agents to devices associated with the cloud services in accordance with the policies. For example, the manager engine 312 could request a key pair be generated by the key generator 306, then send one key to a computing or communication device 206 in the enterprise environment and send another key to an agent for distribution to a device such as a server 214 in the cloud environment, in accordance with one of the policies. The manager engine 312 writes log or logs to the log storage 310 as a history of the cloud services provided to the computing or communication devices in the enterprise environment.

Referring to FIGS. 1 and 3, the functionality of the key and policy manager 120 for control and management of policies in the enterprise environment is explained in more detail. The key and policy manager 120 receives or generates policies relating to computing or communication devices in the enterprise environment and relating to cloud services. Then, the key and policy manager 120 stores the policies in the policy storage 308. If or when a policy is updated, the key and policy manager 120 receives the policy and stores the policy in the policy storage 308. In response to receiving or generating one or more policies, the key and policy manager 120 generates keys, and distributes the keys to the computing or communication devices in the enterprise environment, in accordance with the policies. This could occur prior to a device requesting a cloud service, so that the device is properly set up for encryption and decryption. Alternatively, this could occur in response to the device requesting a cloud service, so that keys are generated as needed for the cloud service and in accordance with the policies. Keys are made by the key generator 306, for example as prompted by the manager engine 312.

In response to receiving or generating one or more policies, the key and policy manager 120 communicates the policies to one or more agents operating in the cloud and associated with the cloud services. This includes communicating policies when a policy is updated at the key and policy manager 120. The key and policy manager 120 could communicate the policies when polled by an agent to do so, in a further embodiment. For example, the manager engine 312 could read the policies from the policy storage 308 and communicate the policies to an agent in the cloud via a network. In one embodiment, these actions occur automatically, so that the policies and keys are distributed automatically after the policies are generated, stored or updated at the key and policy manager 120, without further intervention by a user. In other words, once the policies are stored during setup or updating of the key and policy manager 120, the key and policy manager 120 automatically performs operations of distributing the policies to the agent(s) and generating and distributing keys. The agent 126, upon receiving policies automatically enforces them, and upon receiving keys from the key and policy manager 120, automatically distributes them in accordance with the policies, without further intervention by a user.

Figure 4:
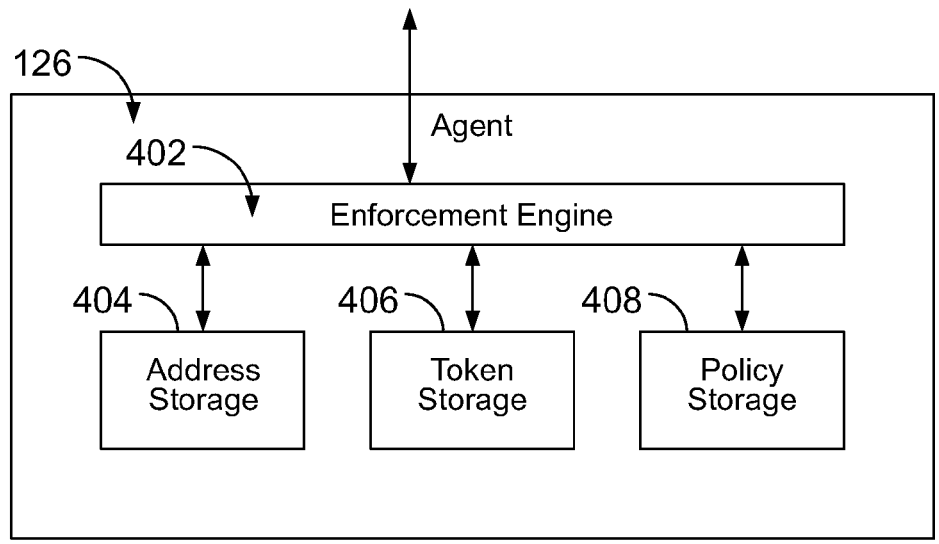
FIG. 4 is a schematic diagram of modules or components of an agent from FIG. 2, in accordance with some embodiments.

FIG. 4 shows an embodiment of an agent 126, which includes an enforcement engine 402, an address storage 404, a token storage 406 and a policy storage 408. In various embodiments, the agent 126 is implemented as a standalone device, or as one or more modules in a server or other network appliance. The enforcement engine 402 could be implemented as one or more processes executing on a processor, for example a processor in a server or other computing device. The storages could be implemented using memory coupled to the processor. This could be a single memory with associated regions for the various types of data, or links, or a relational database. Other types of memory and memory usage are readily devised for storing the addresses, tokens and policies. In the example shown, the IP addresses of the key and policy managers are stored in the address storage 404, the access tokens of the key and policy managers are stored in the token storage 406, and the policies of the key and policy managers are stored in the policy storage 408. These are associated with one another, so that the enforcement engine 402 can distinguish among tokens and policies of various key and policy managers. The enforcement engine 402 applies the appropriate access tokens and policies, and communicates using the appropriate IP address, of each key and policy manager in some embodiments. For example, in one embodiment a key and policy manager generates a first access token, which a first agent uses to authenticate communication from the key and policy manager. Then, the key and policy manager generates a second access token, which a second agent uses to authenticate communication from the key and policy manager. Meanwhile, another key and policy manager generates a third access token, which the first agent uses to authenticate communication from that key and policy manager. Additional scenarios are readily devised, in which various key and policy managers generate tokens for various agents, and the various agents use the tokens to authenticate communications from the respective key and policy managers.

Still referring to FIG. 4, the enforcement engine 402 arranges for the software as a service provider to provide the services to the computing or communication devices in the enterprise environment in accordance with the policies. In part, the enforcement engine 402 does so by distributing one or more keys, provided by the key and policy manager, to devices of the software as a service provider in accordance with the policies. The agent 126 receives the policies from the key and policy manager. Then, the agent 126 enforces the policies, by engaging the enforcement engine 402. The policies are enforced relative to services provided by the software as a service provider and relative to the computing or communication devices in the enterprise environment receiving the services provided by the software as a service provider. The agent 126 authorizes and authenticates communications from the key and policy manager to the agent 126, via application of an access token generated by the key and policy manager. The agent 126 accomplishes this by applying the access token to the communications in some embodiments. It should be appreciated that the keys brought to enforcement engine 402 are provided in a secure manner in some embodiments.

Referring to FIGS. 1, 3, and 4, audits can be conducted by an agent 126. The agent 126 requests a log from one or more key and policy managers and produces an audit based on the log from the one or more key and policy managers. Audits can be communicated by the agent 126 back to the key and policy manager 120, so that the reports can be generated for the enterprise, e.g. by the key and policy manager 120 associated with the enterprise. Alternatively, audits can be communicated to a system log server, which could be either a server in the enterprise or a server in the cloud. When an agent 126 is communicating with multiple key and policy managers, the agent 126 could sort logs received from the key and policy managers and issue separate audits to differing enterprises. Each log is authenticated by the receiving agent, using the appropriate token, so that each log is kept secure by a token issued from within the enterprise. When a key and policy manager is communicating with multiple agents 126, the agents 126 could send audits back to the key and policy manager for consolidation. Thus, in the one-to-one, one-to-many, many-to-one, or many-to-many architectures of which key and policy managers and agents are capable, each key and policy manager can get audit information specific its own user computing or communication devices in the enterprise.

Figure 5A:
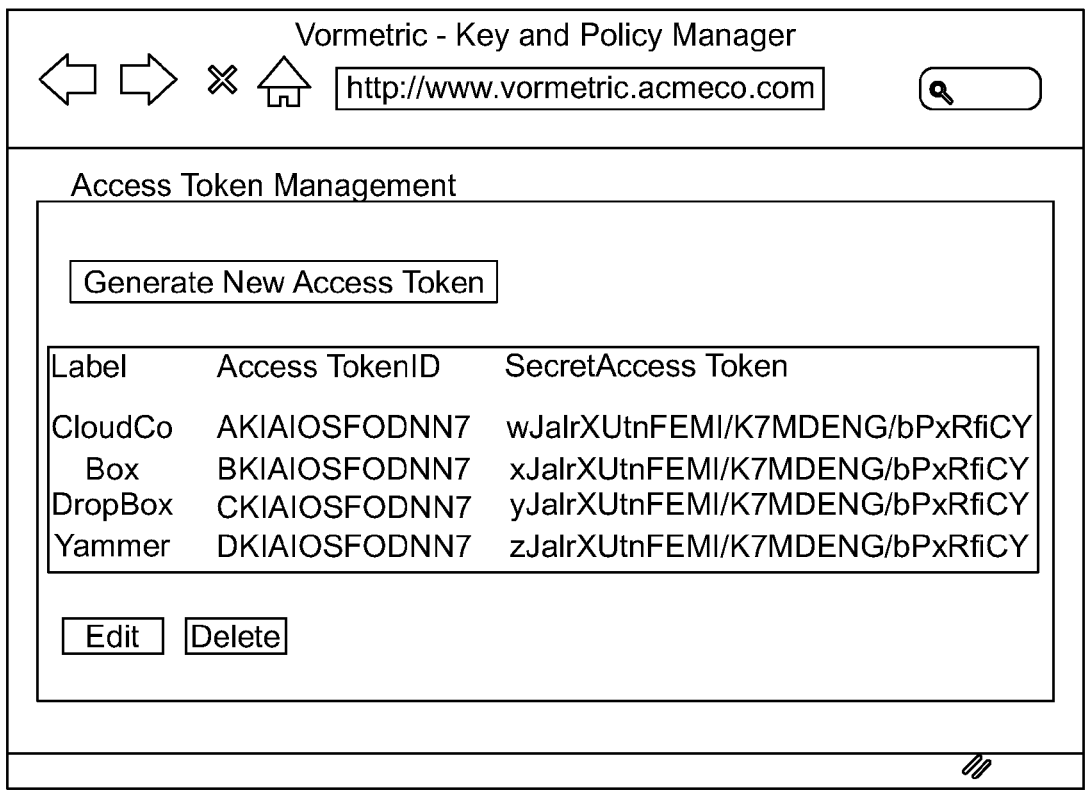
FIG. 5A is a screenshot of a configuration screen from the key and policy manager of FIG. 2, in accordance with some embodiments.

FIGS. 5A-D illustrate communication mechanisms used in some embodiments of the security system. FIGS. 5A and 5B show configuration screens, and FIGS. 5C and 5D show formats of data packets used in communication. In FIG. 5A, a key and policy manager in the enterprise is being set up. A user interacts with the key and policy manager via a user interface, which could appear as a webpage in some embodiments. A network protocol address is specified for the particular key and policy manager, for instance an IP address as shown. A user can click on a command to "Generate New Access Token", which results in an access token being generated. The access token is depicted as having a label for the software as a service provider (i.e., provider of a cloud service), an access token ID (identifier), shown as a first character string, and a secret access token, shown as a second character string. A user would then direct communication of the access token ID and the secret access token, perhaps with encryption, to the cloud service provider for use in setting up an agent. For example, the access token ID and secret access token be could be communicated verbally, via a telephone call, or in an encrypted email, or transmitted automatically from the key and policy manager to a specified agent in some embodiments. The latter would be especially useful in a situation of clustered key and policy managers in an enterprise. As shown in the screenshot of the user interface page, the key and policy manager could be communicating with multiple agents, each of which has a unique label, access token ID and secret access token. The process of adding another agent with which to communicate involves generating a new access token and communicating the access token ID and secret access token to that agent.

In FIG. 5B, an illustration is provided for setting up or establishing an agent. A user interacts with the agent via a user interface, which could appear as a webpage or some other graphical user interface. The network protocol address of a particular key and policy manager, for example an IP address, is specified for the particular agent. Under "Key and Policy Management" a selection indicates whether keys and policies are managed by the cloud company or externally. In the case of external key and Policy Management, the hostname, e.g., an IP address, is specified. In this example the hostname is the IP address of the key and policy manager. The access token ID and the secret access token are entered in association with the hostname. On another screen or screens, host names and access token information for additional key and policy managers can be entered.

Using the setup screens shown in FIGS. 5A and 5B, or variations thereof, the cloud service provider deploys an encryption and policy enforcement agent that receives policy information from an internal or external key and policy manager. The agent can be provisioned so that it can communicate with any key and policy manager that is visible in the network as long as valid credentials are provided. The enterprise signing up with the cloud service provider will have the option to rely on a key and policy manager hosted by the cloud service provider, or to specify its own external key and policy manager. The cloud service provider will expose an interface such as a configuration port to specify network and authentication parameters so that the encryption and policy enforcement agent running in the cloud service provider environment can receive key and policy information from a key and policy manager completely under control of the enterprise. With reference back to FIG. 1, in one embodiment, communication between a key and policy manager and an agent is agent-initiated. Such an arrangement is particularly suitable when it is desired that an agent in a software as a service provider can communicate outward, i.e., to an enterprise, but that communication inward to the agent should be limited for security reasons. In this situation, a polling mechanism can be employed by the agent as depicted below.

FIG. 5C shows the format of one embodiment of a poll packet sent by an agent, in an implementation of a polling mechanism. The poll packet contains fields having a session identifier, a sequence number, a configuration reference, a status reference, and a hashed message authentication code (HMAC). The hashed message authentication code is formed using a hash function on the entirety of the packet prior to inclusion of the hashed message authentication code in some embodiments. During initial contact from the agent to a server, a session identifier could be provided by the server to the agent. This session identifier will be used in all subsequent polls and responses to identify the current session. The session identifier could have a range of values, and it may be convenient for the server software to include some useful data to aid look-up of the agent details when a poll is received. In one embodiment, the session identifier is a host session lookup key, such as a hash value created from the host. In a further embodiment, a random number is provided by the server. In a still further embodiment, a random number is generated by the agent. The sequence number is assigned to the packet. It should be appreciated that including a sequence number ensures that the same packet will never be used twice, which in turn means the hashed message authentication code will never be repeated. This allows both the server and agent to identify the packet.

Continuing with FIG. 5C, the configuration reference is extracted from the most recent configuration update sent by the server, and can be used by the server to know whether the agent needs to fetch an updated configuration in some embodiments. In one embodiment, an invalid value is used initially (e.g., −1), to indicate that there has not yet been a configuration update. In some embodiments, a timestamp or date code could be used. In further embodiments, a version value is increased each time a configuration of a policy or a guard point is changed. The status reference is used to indicate whether or not a status has changed. In one embodiment, a status collection is performed at regular intervals, where the interval is not directly related to the polling rate. During the status collection, a hash value is generated, and compared to the previous status hash value. If the hash values differ, i.e., the status is changed, then the status reference included in the next poll packet sent to the server is updated. If the hash value differs from the hash value already known to the server, or the server has no saved status record, then the server sets the status upload request flag in the response (see FIG. 5D).

FIG. 5D shows the format of one embodiment of a response packet from the server to the key and policy manager. The response packet contains fields having the session identifier, the sequence number, a request for status upload, a request for configuration download, a request to reset the session, and a hashed message authentication code. The session identifier and sequence number are as described above with reference to FIG. 5C, and the hashed message authentication code is calculated relative to the response packet. The request for status upload is set when the server wants the agent to upload a full status report. The agent may perform an update whenever status has changed. However, as this may result in unpredictable loading on the server, this could be a configurable option. If the upload only occurs after a request from the server, the server has the ability to control the rate of uploads. In some embodiments, the request for configuration download is set by the server when the configuration data for the agent system has changed, for example when a guard point is enabled, and a logging setting is changed. A configuration download request is performed when this flag is set. In one embodiment, the server sets this flag if the configuration reference provided in the poll packet does not match the value held by the server. The request to reset the session is set by the server if the server receives a poll with a session ID that the server does not recognize in some embodiments. This could occur if the server restarts, as existing sessions may no longer be valid. This could also occur if an agent image is restored from a snapshot.

Figure 6:
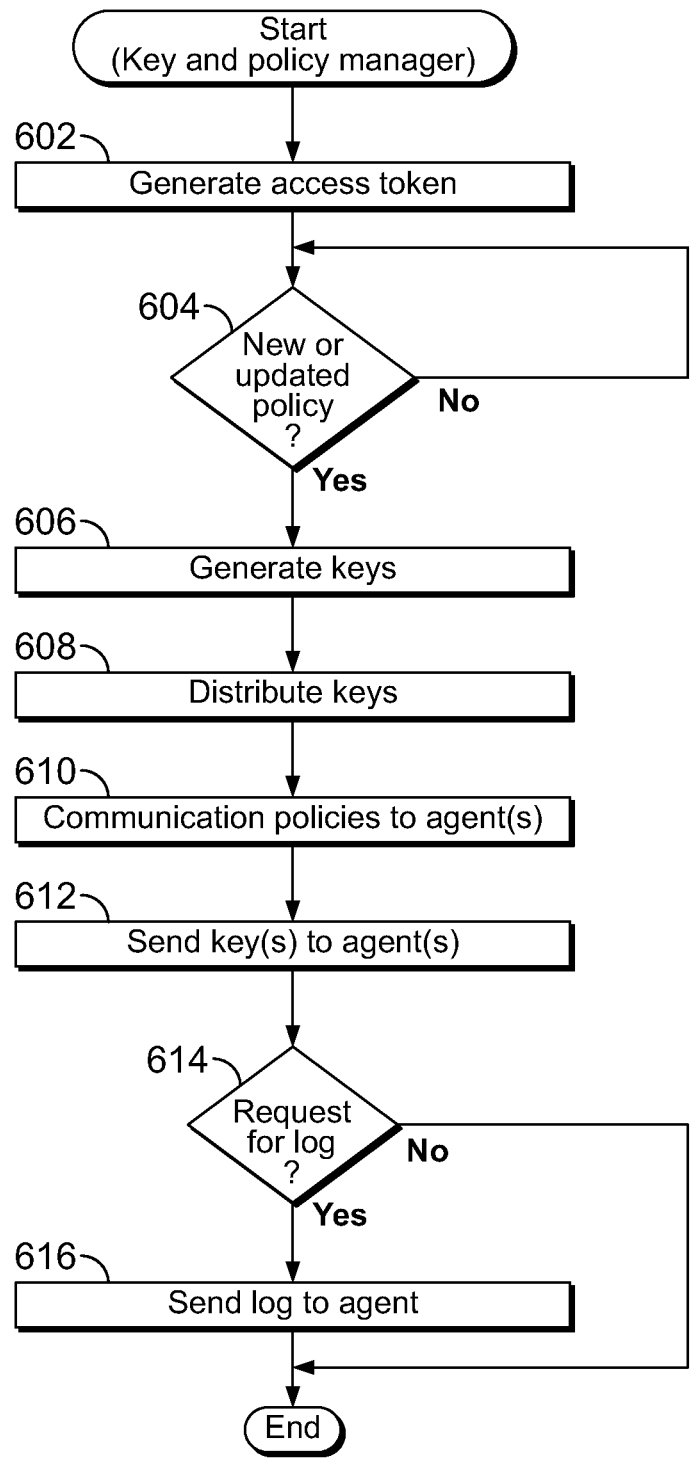
FIG. 6 is a flow diagram of a method of managing keys and policies, which can be performed by the key and policy manager of FIGS. 1-3, in accordance with some embodiments.

FIG. 6 is a flow diagram of a method of managing keys and policies, which can be practiced using a key and policy manager. The method could be practiced by having a processor perform one or more steps. From a start point, an access token is generated in an action 602. For example the manager engine in a key and policy manager could instruct the token generator to generate one or more access tokens. The token could be used later by an agent, to authenticate a communication from the key and policy manager. In a decision action 604, a question is asked, is there a new or updated policy? If the answer is no, there is not a new or updated policy, flow loops at the decision action 604. If the answer is yes, there is a new or updated policy, flow branches to the action 606. For example, the key and policy manager could receive a new or updated policy, and store the policy in the policy storage. Keys are generated, in the action 606. For example, the manager engine in the key and policy manager could instruct the key generator to generate keys. These keys will be used in securing data in accordance with the policy or policies.

The keys are distributed, in an action 608 of FIG. 6. For example, the manager engine could distribute one or more keys to computer or communication devices of an enterprise, in the enterprise environment. The policies are communicated to one or more agents, in an action 610. For example, the key and policy manager could communicate the policies from the enterprise environment to an agent in the cloud environment. A key or keys are sent to an agent or agents, in an action 612. For example, the key and policy manager could send one or more keys from the enterprise environment to the agent in the cloud environment. In a decision action 614, a question is asked, is there a request for a log? If the answer is no there is no request for a log, the flow branches to the endpoint. If the answer is yes, there is a request for a log, flow branches to the action 616. In the action 616, a log is sent to the agent. For example, the key and policy manager could read the log from the log storage and send the log from the enterprise environment to the agent in the cloud environment. After the action 616, there is an endpoint. In further embodiments, flow could loop or branch to other points or processes, or repeat again at the start or other entry point.

Figure 7:
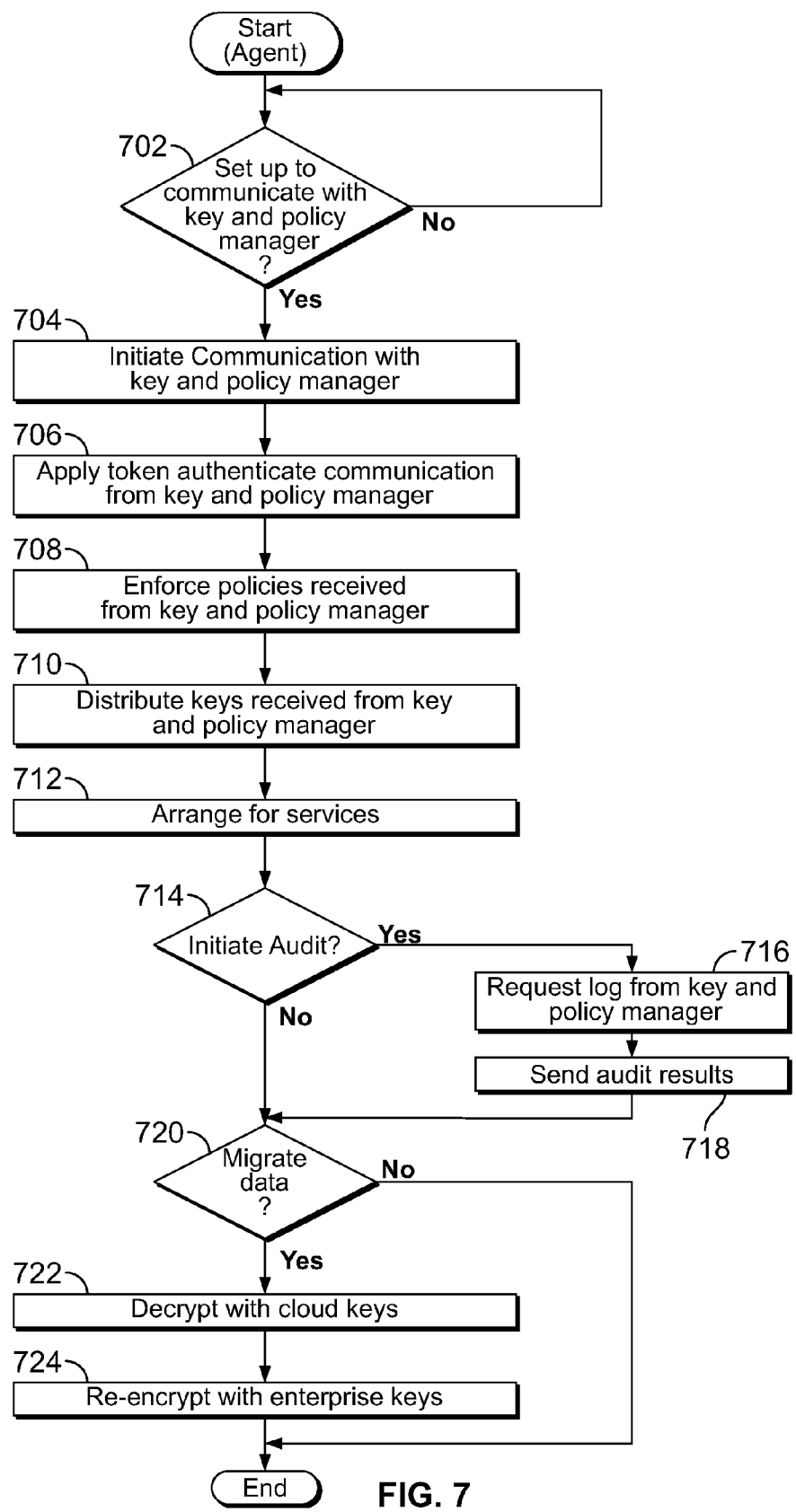
FIG. 7 is a flow diagram of a further method of managing keys and policies, which can be performed by the agent of FIGS. 1, 2 and 4, in accordance with some embodiments.

FIG. 7 is a flow diagram of a further method of managing keys and policies, which can be practiced using an agent. The method could be practiced by having a processor perform one or more steps. From a start point, a decision action 702 asks a question, is the system set up to communicate with the key and policy manager? For example, has the agent been through the setup process so that the agent has information about the network address of a key and policy manager? If the answer is no, communication is not yet set up, the flow loops at the decision action 702. If the answer is yes, the communication is set up, flow branches to the action 704. In the action 704, communication is initiated with the key and policy manager. The agent could apply the polling mechanism, or otherwise contact the key and policy manager. In an action 706, a token is applied to authenticate communication from the key and policy manager. For example, the token could be obtained from the key and policy manager as part of the setup process. The communication could include the policies, or keys sent from the key and policy manager, or both. The policies received from the key and policy manager are enforced, in an action 708. The keys received from the key and policy manager are distributed, in an action 710. These keys are distributed in accordance with the policies.

Services are arranged for, in an action 712 of FIG. 7. For example, the key and policy manager authorizes a server of a software as a service (SaaS) provider to provide cloud services to a user computing and communication device in the enterprise. Data involved in the service would be encrypted in the cloud using a key from the key and policy manager as sent to the agent and distributed to the server. The data would then be decrypted in the enterprise environment using another key that the key and policy manager has sent to the computing and communication device in the enterprise, for example. As a further example, data involved in the service would be encrypted in the enterprise environment using a key from the key and policy manager, and stored as encrypted data in the cloud environment, or decrypted and applied to a process in the cloud environment using a key from the key and policy monitor as distributed by the agent. Distribution and usage of these keys is in accordance with the policies, as directed by the key and policy manager and enforced by the agent. The service is thus provided in accordance with the policies. The policies are thus enforced.

Continuing with FIG. 7, in a decision action 714, a question is asked, should an audit be initiated? If the answer is no, there is no audit, flow branches to the decision action 720. If the answer is yes, an audit should be initiated, flow branches to the action 716. In the action 716, the log is requested from the key and policy manager. For example, the agent could request the log from the key and policy manager. In an action 718, the audit results are sent. For example the agent could send the audit results to the key and policy manager, or to a system log server. Flow continues with the decision action 720. In the decision action 720, the question is asked, should data be migrated? If the answer is no, the data should not be migrated, the flow branches to an endpoint, or to another process or to another entry point. If the answer is yes, the data should be migrated, the flow branches to the action 722. In the action 722, the data is decrypted with cloud keys. For example, data being migrated could be decrypted using keys that were generated in the cloud, such as by the system as a software provider.

In an action 724 of FIG. 7, the data is re-encrypted with enterprise keys. For example, the newly decrypted data is re-encrypted using keys generated in the enterprise environment by the key and policy manager. These keys could be distributed from the key and policy manager to the agent, and the agent could distribute the keys to the appropriate server of the software as a service provider, in the cloud environment, in accordance with the policies. The data is thus migrated from cloud keys to enterprise keys. After the action 724, flow branches to the endpoint, or to another process or to another entry point.

Figure 8:
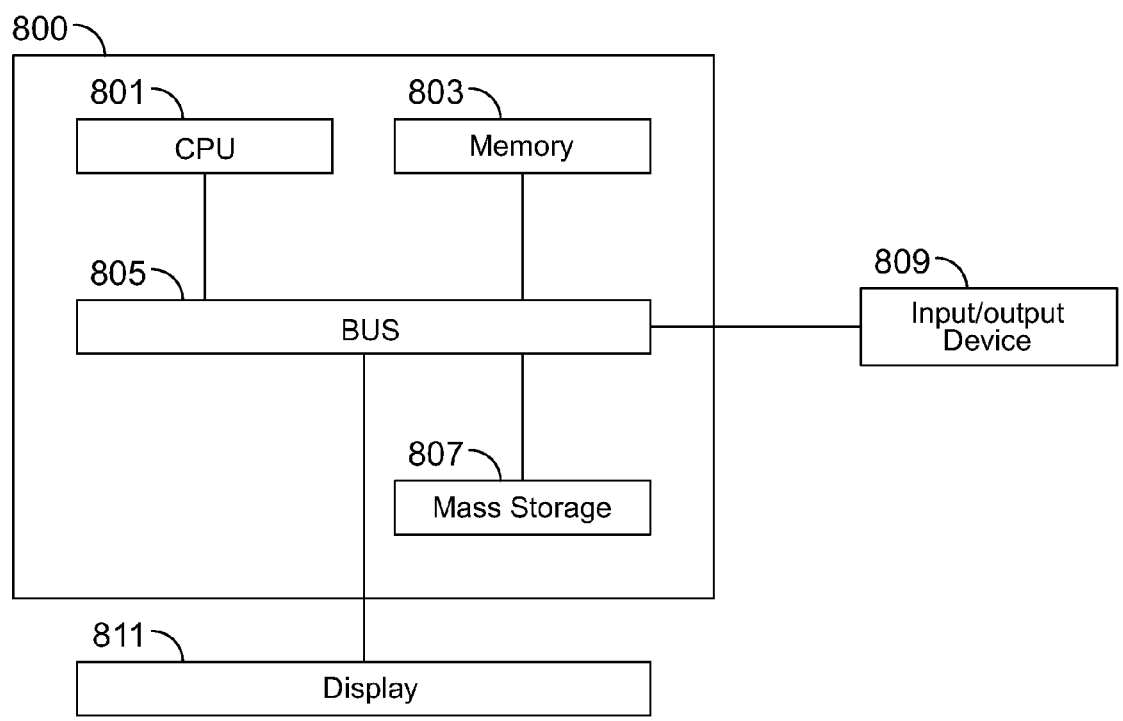
FIG. 8 is an illustration showing an exemplary computing device which may implement the embodiments described herein.

It should be appreciated that the methods described herein may be performed with a digital processing system, such as a conventional, general-purpose computer system. Special purpose computers, which are designed or programmed to perform only one function may be used in the alternative. FIG. 8 is an illustration showing an exemplary computing device which may implement the embodiments described herein. The computing device of FIG. 8 may be used to perform embodiments of the functionality for managing keys and policies in accordance with some embodiments. The computing device includes a central processing unit (CPU) 801, which is coupled through a bus 805 to a memory 803, and mass storage device 807. Mass storage device 807 represents a persistent data storage device such as a floppy disc drive or a fixed disc drive, which may be local or remote in some embodiments. Memory 803 may include read only memory, random access memory, etc. Applications resident on the computing device may be stored on or accessed via a computer readable medium such as memory 803 or mass storage device 807 in some embodiments. Applications may also be in the form of modulated electronic signals modulated accessed via a network modem or other network interface of the computing device. It should be appreciated that CPU 801 may be embodied in a general-purpose processor, a special purpose processor, or a specially programmed logic device in some embodiments.

Display 811 is in communication with CPU 801, memory 803, and mass storage device 807, through bus 805. Display 811 is configured to display any visualization tools or reports associated with the system described herein. Input/output device 809 is coupled to bus 505 in order to communicate information in command selections to CPU 801. It should be appreciated that data to and from external devices may be communicated through the input/output device 809. CPU 801 can be defined to execute the functionality described herein to enable the functionality described with reference to FIGS. 1-7. The code embodying this functionality may be stored within memory 803 or mass storage device 807 for execution by a processor such as CPU 801 in some embodiments. The operating system on the computing device may be MS DOS™, MS-WINDOWS™, OS/2™, UNIX™, LINUX™, or other known operating systems. It should be appreciated that the embodiments described herein may be integrated with virtualized computing system also. In addition, the embodiments may be integrated or implemented as part of a cloud computing environment where remote computer resources and/or services are provisioned over a network.

Embodiments of the above-described data security system thus provide a mechanism to automatically secure data in the cloud with a key and policy manager based on-premise. In addition, audit information for event across several different cloud services can be automatically captured on-premise. The data security system provides automatic data security in the cloud while maintaining control from the enterprise (i.e., on-premise). In a case where the enterprise has a trusted environment but the cloud is a lower trust environment, the data security system provides automatic key and policy management from a trusted environment for enforcement in a lower trust environment such as a service provider operating in the cloud environment. The data security system can provide centralized collection and consolidation of non-tampered audit log information from an un-trusted environment back to a trusted environment.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The embodiments can also be embodied as computer readable code on a computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method of managing keys and policies, comprising:
communicating enterprise policies from a key and policy manager in a computing device in an enterprise environment to an agent while the agent is in a computing or communication device in a cloud environment;
generating keys at the key and policy manager;
distributing one or more of the keys from the key and policy manager in the enterprise environment to computing or communication devices in the enterprise environment, in accordance with the enterprise policies; and
enforcing the enterprise policies in the cloud environment via an application of the enterprise policies by the agent in the cloud environment, wherein at least one method operation is executed through a processor,
migrating data in the cloud environment from usage of keys generated in the cloud environment to usage of the keys generated at the key and policy manager, via decryption with the keys generated in the cloud environment and re-encryption with the keys generated at the key and policy manager.

2. The method of claim 1, wherein enforcing the policies includes:
providing software services from the cloud environment to the computing or communication devices in the enterprise environment in accordance with the enterprise policies as received by the agent.

3. The method of claim 1, further comprising:
sending a further one or more of the keys from the key and policy manager to the agent, wherein enforcing the enterprise policies in the cloud environment includes the agent distributing the further one or more of the keys to one or more servers in the cloud environment in accordance with the enterprise policies.

4. The method of claim 1, further comprising:
generating an access token at the key and policy manager, wherein the agent authenticates communications from the key and policy manager via application of the access token.

5. The method of claim 1, further comprising:
initiating an audit at the agent;
collecting at least one log from at least one key and policy manager, at the agent; and
sending a result of the audit, based on the at least one log, to a system log server or to the at least one key and policy manager.

6. The method of claim 1, wherein updating or adding to the enterprise policies in the key and policy manager results in an automatic communication of an updated or added enterprise policy from the key and policy manager to the agent.

7. A non-transient, tangible, computer-readable medium having thereupon instructions which, when executed by a processor cause the processor to perform a method comprising:
generating, at a key and policy manager implemented in a computing device in an enterprise environment, enterprise policies relating to computing devices in the enterprise environment and relating to cloud services;
generating keys at the key and policy manager in the enterprise environment;
distributing the keys from the key and policy manager in the enterprise environment to the computing devices in the enterprise environment in accordance with the enterprise policies; and
communicating the enterprise policies from the key and policy manager in the enterprise environment to one or more agents operating in one or more computing or communication devices outside of the enterprise environment, wherein the one or more agents enforce the enterprise policies relative to the environment outside of the enterprise environment as provided to the computing devices in the enterprise environment,
migrating data in the cloud environment from usage of keys generated in the cloud environment to usage of the keys generated at the key and policy manager, via decryption with the keys generated in the cloud environment and re-encryption with the keys generated at the key and policy manager.

8. The media of claim 7, wherein the method further comprises:
sending further keys from the enterprise environment to the one or more agents for distribution by the one or more agents operating outside of the enterprise environment in accordance with the enterprise policies.

9. The media of claim 7, wherein the method further comprises:
sending a log from the enterprise environment to the one or more agents, in response to an audit request from the one or more agents, the log relating usage of the cloud services as provided to the computing or communication devices in the enterprise environment.

10. The media of claim 7, wherein the method further comprises:
generating a first access token for a first agent; and
generating a second access token for a second agent.

11. The media of claim 7, wherein:
a key and policy manager in the enterprise environment maintains control of the keys and the enterprise policies, the key and policy manager including the processor performing the method; and
a secure environment is extended from the enterprise environment to cloud service providers, via the enterprise policies and the keys.

12. A data security system comprising:
a key and policy manager that is operable in a computing device in an enterprise environment and includes at least one processor, the key and policy manager configured to:
receive enterprise policies relating to communication devices in the enterprise environment and relating to cloud services;
generate keys, and distribute the keys to the communication devices in the enterprise environment in accordance with the enterprise policies; and
communicate the enterprise policies to one or more agents operating in a cloud environment external to the enterprise environment, the cloud environment associated with the cloud services; and
an agent that is operable in a computing or communication device in a software as a service (SaaS) provider in the cloud, the agent configured to:
receive the enterprise policies from the key and policy manager that is operable in the enterprise environment; and
enforce the enterprise policies relative to services provided by the SaaS provider and relative to the computing or communication devices in the enterprise environment receiving the services provided by the SaaS provider,
whether the system migrates data in the cloud environment from usage of keys generated in the cloud environment to usage of the keys generated at the key and policy manager, via decryption with the keys generated in the cloud environment and re-encryption with the keys generated at the key and policy manager.

13. The data security system of claim 12, wherein the key and policy manager includes:
a network protocol address storage configured to store a network protocol address;
a token generator configured to generate access token identifiers and secret access tokens;
a key generator configured to generate the keys for encryption and decryption;
a policy storage configured to store the enterprise policies;
a log storage configured to store one or more logs; and
a manager engine configured to:
send one or more of the keys to one or more of the communication devices in the enterprise environment in accordance with the enterprise policies;
send a further one or more of the keys to the one or more agents for distribution by the one or more agents to devices associated with the cloud services in accordance with the enterprise policies; and
write the one or more logs to the log storage as a history of the cloud services provided to the communication devices in the enterprise environment.

14. The data security system of claim 12, wherein the agent includes:
a storage configured to store network protocol addresses of one or more key and policy managers, access tokens of the one or more key and policy managers, and enterprise policies of the one or more key and policy managers; and
an enforcement engine, configured to:
arrange for the SaaS provider to provide the services to the computing or communication devices in the enterprise environment in accordance with the enterprise policies; and
distribute one or more keys, provided by the key and policy manager, to devices of the SaaS provider in accordance with the enterprise policies.

15. The data security system of claim 12, wherein the agent is further configured to:
authorize and authenticate communications from the key and policy manager to the agent, via application of an access token generated by the key and policy manager.

16. The data security system of claim 12, further comprising:
the key and policy manager configured to:
write a log; and
send the log to the agent; and
the agent configured to:
request a log from one or more key and policy managers; and
produce an audit based on the log from the one or more key and policy managers.

17. The data security system of claim 12, wherein:
all communication between the key and policy manager and the agent is agent-initiated; and
at least one communication between the key and policy manager and the agent includes the agent polling the key and policy manager.

18. The data security system of claim 12, further comprising:
the key and policy manager configured to:
generate a first access token; and
generate a second access token, wherein a further agent authenticates communication from the key and policy manager through usage of the second access token; and
the agent configured to:
authenticate communication from the key and policy manager through usage of the first access token; and
authenticate communication from a further key and policy manager through usage of a third access token generated by the further key and policy manager.

19. The data security system of claim 12, wherein the key and policy manager is configured to communicate one or more enterprise policies to the one or more agents and generate one or more keys, in response to the key and policy manager performing one from a set consisting of: receiving the one or more enterprise policies, receiving an update to the one or more enterprise policies, and generating the one or more enterprise policies.

* * * * *